May 25, 1937. P. A. SCHMUCK 2,081,773
CABLE SPLICING DEVICE
Filed July 2, 1936
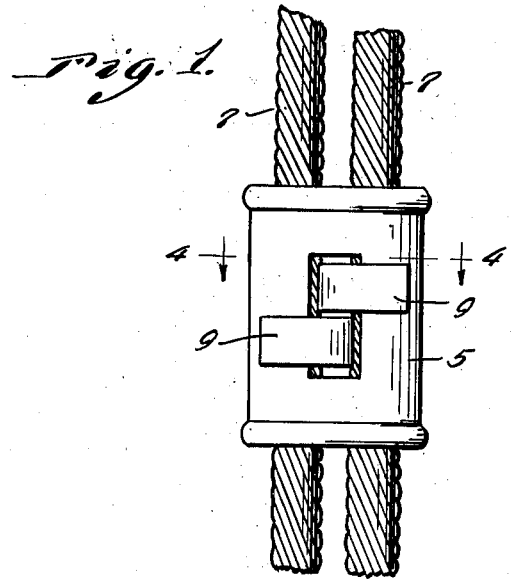
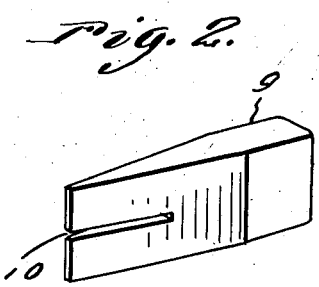
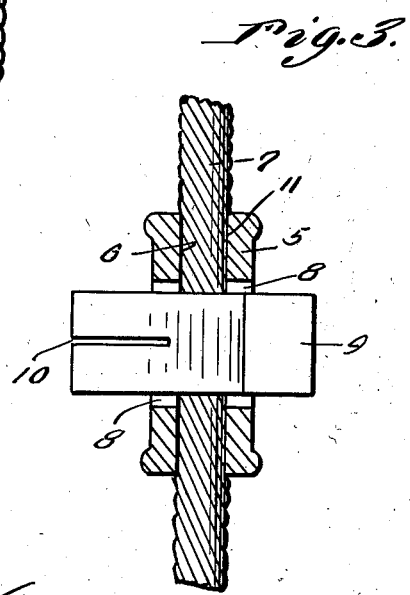
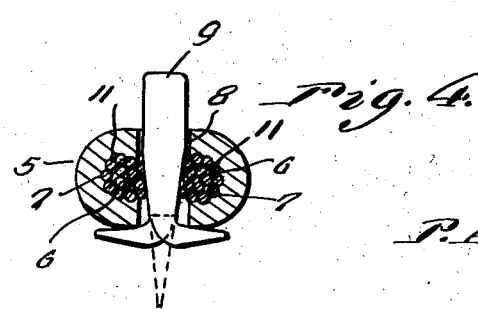
Inventor
P. A. Schmuck
By Clarence A. O'Brien
Attorney Patented May 25, 1937

2,081,773

UNITED STATES PATENT OFFICE 2,081,773

CABLE SPLICING DEVICE

Philip A. Schmuck, Winter Haven, Fla.

Application July 2, 1936, Serial No. 88,675

1 Claim. (Cl. 24—136)

The object of this invention is to provide a device for splicing cables or for securing together the parallel portions of a rope or cable in a manner to form a loop for the cable, or for any other purpose.

A still further object of the invention is to provide a device of the character above mentioned, wherein the clamping action is obtained by a wedge.

A still further object of the invention is to provide a device of the character mentioned which is characterized by extreme simplicity and economy in construction and having means for securing the wedge in position.

The invention together with its objects and advantages will be best understood from a study of the following description taken in connection with the accompanying drawing wherein:

Figure 1 is an elevational view of the device illustrating the application of the same.

Figure 2 is a perspective view of the wedge.

Figure 3 is a vertical sectional view through the device.

Figure 4 is a sectional view taken substantially on the line 4—4 of Figure 1.

In accordance with the present invention, the cable splicing device comprises a body member 5 in the nature of a sleeve substantially rectangular in cross section as will be understood from a study of Figure 4 and formed of metal, bronze or other suitable material. The sleeve 5 is of such a shape in cross sectional construction as to provide therein parallel grooves 6 for accommodating the portions 7—7 of a rope, cable or guy rope which are threaded through the sleeve in a manner thought apparent. The sleeve or body member 5 at opposite sides thereof is provided with slots 8 through which is passed a wedge member 9.

As shown, the wedge member 9 which is formed of metal or any other suitable material has a substantially rectangular end portion that is accommodated partly in one of the slots 8, and a tapered portion that is passed through the sleeve 5 between the cables 7 to project through the slot 8 in the opposite side of the sleeve or body. When forced through the body in this manner between the cable parts 7, said cables are forced into the grooves 6 and are clamped therein.

To prevent withdrawal of the wedge 9 as might result from the strain which is imposed on the cable the tapered part of the wedge is split longitudinally as at 10 and the portions of the wedge above and below the split 10 are bent into engagement with one side of the sleeve 5 and in reverse or opposite directions relative to one another as will be clear from a study of Figures 1 and 4.

It will be apparent that with the split portion of the wedge bent in the manner described, the wedge will be securely retained in place and will serve with the walls of the grooves 6 to secure the parts 7—7 of the cable spliced in a manner to connect the ends of two cable sections or to secure an end of a cable in loop form as may be found desirable.

For cooperating with the wedge 9 to secure the ends of the cable sections positively within the grooves 6 the walls of the grooves are corrugated as indicated generally at 11, with the corrugations being complemental to the convolutes of the spirally wrapped strands of the cable to the end that the convolutes will so engage the corrugations 11 as to preclude a slipping of the cable sections and the clamps relative to one another.

What is claimed is:

As a new article of manufacture a rope clamp or splicing device comprising a sleeve provided with slots in opposite sides thereof intermediate the ends of the sleeve, said sleeve having internal longitudinal channels at each side of said slot for receiving a pair of cables for seating in the respective channels, and a wedge having end portions adapted to engage in the slots, said wedge being positioned between the cables for retaining the same in said channels and said wedge having a split tapered end for bending oppositely against the sleeve transversely of the cables.

PHILIP A. SCHMUCK.